United States Patent [19]
Holdampf et al.

[11] Patent Number: 5,238,285
[45] Date of Patent: Aug. 24, 1993

[54] FOLDING VEHICLE BEDSEAT

[75] Inventors: Carl J. Holdampf, Farmington Hills; David J. Mulawka, Roseville; Steven J. Michell, Commerce, all of Mich.

[73] Assignee: Douglas & Lomason Company, Farmington Hills, Mich.

[21] Appl. No.: 915,060

[22] Filed: Jul. 16, 1992

[51] Int. Cl.⁵ .................................................. B60N 2/10
[52] U.S. Cl. ................................. 296/65.1; 297/326; 297/336; 248/503.1
[58] Field of Search ................. 296/68.1, 65.1, 68, 296/63; 297/325, 326, 335, 336, 344; 248/503.1

[56] References Cited
U.S. PATENT DOCUMENTS

| | | | |
|---|---|---|---|
| 1,732,169 | 10/1929 | Provost et al. | 297/326 X |
| 4,484,776 | 11/1984 | Gokimoto et al. | 296/65.1 |
| 4,627,656 | 12/1986 | Gokimoto et al. | 296/65.1 |
| 4,805,953 | 2/1989 | Yamauchi | 296/65.1 |
| 4,869,541 | 9/1989 | Wainwright | 296/65.1 |
| 4,925,229 | 5/1990 | Siebler | 296/65.1 |
| 4,932,706 | 6/1990 | Wainwright et al. | 296/65.1 |
| 4,932,709 | 6/1990 | Wainwright | 296/65.1 |
| 4,957,321 | 9/1990 | Martin et al. | 296/65.1 |
| 4,978,158 | 12/1990 | Kubo et al. | 296/65.1 |
| 4,979,773 | 12/1990 | Eubank | 296/65.1 |
| 4,986,591 | 1/1991 | Martienssen et al. | 296/65.1 |
| 5,044,683 | 9/1991 | Pärsson | 296/65.1 |

FOREIGN PATENT DOCUMENTS

| | | | |
|---|---|---|---|
| 0104424 | 6/1982 | Japan | 296/65.1 |
| 0052536 | 2/1989 | Japan | 296/65.1 |

Primary Examiner—Dennis H. Pedder
Attorney, Agent, or Firm—Harness, Dickey & Pierce

[57] ABSTRACT

A folding vehicle bedseat assembly having upper and lower seat cushion portions with corresponding upper and lower frames is disclosed. A preferred folding and support mechanism of the assembly provides for the seat assembly to be moved between an unfolded use configuration and a folded stowage configuration, as well as to be releasably retained in either of such configurations, by way of operation of a single actuation handle. The preferred folding mechanism also allows the seat assembly to be moved to the stowage position without substantially changing the forwardmost projection of the seat assembly.

18 Claims, 3 Drawing Sheets

FOLDING VEHICLE BEDSEAT

BACKGROUND AND SUMMARY OF THE INVENTION

The present invention relates generally to foldable or collapsible seating arrangements, and more particularly to such seating arrangements for the interiors of automotive vehicles.

In various types of automotive seating arrangements, it is frequently desirable, or even necessary, to provide the capability of relocating, flattening, folding, collapsing, or even completely removing a seat assembly in order to increase the vehicle's cargo space, accommodate large or bulky items that need to be transported, to use the seat as a bed, or to otherwise enhance the vehicle's utility or meet the desires or needs of the user. Such capability is especially important in vans, minivans, recreational vehicles, or multipurpose vehicles, as well as in other similar types of vehicles.

In an attempt to provide the capability for variable seating configurations, a number of widely varying seating arrangements have been devised in order to accomplish these objectives. Although many of these prior art arrangements have performed fairly well and have served their intended purposes in varying degrees, they have typically suffered from the disadvantages of being overly complex, cumbersome or difficult to manufacture, install or operate, being heavy and thus requiring high degrees of user effort to actuate them, or they have unable to provide the desired amount of clearance without interfering with other fixed or movable seating units or other functions of the vehicle.

Some examples of prior art folding seat arrangements are disclosed in U.S. Pat. Nos. 4,627,656; 4,484,776; 4,805,953; 4,869,541; 4,932,706; 4,957,321; 4,986,591; and 5,044,683, for example, with the arrangements disclosed in these patents suffering from one or more of the above-discussed disadvantages or others.

In order to overcome the above-described difficulties and disadvantages of such prior variable-configuration seating systems, the present invention provides a folding seat assembly that is especially adapted for use in a vehicle interior, that is relatively simple and economical to manufacture and install, that is convenient and easy for a user to operate, that maximizes the utility of the seat assembly and thus the vehicle, and that minimizes the space occupied in a stored, or stowage, configuration, as well as the interference with other vehicle components.

In a preferred form of the invention, the folding bedseat assembly includes a lower frame, upon which a lower seat cushion is mounted or attached, a support mechanism for supporting the lower frame, and thus the seat assembly, in the vehicle interior and operable for moving the lower frame between a generally horizontal position, referred to as a "use" position, and a generally vertical position, referred to as a "stowage" position.

The preferred support mechanism includes first and second retention means, with the first retention means being adapted for releasably retaining the lower frame in the use position, and the second retention means being adapted for releasably retaining the lower frame portion of the seat assembly in the stowage position. The support mechanism also includes a single actuation lever or handle, operable by the user for easily moving the lower frame between the use position and the stowage position.

Typically, the seat assembly also includes an upper frame, upon which an upper cushion is mounted or attached. Such upper frame is pivotally interconnected with the lower frame, with the upper frame being foldable between at least an unfolded, generally vertical use position and a forwardly folded stowage position, as well as an optional backwardly folded position, generally flat with respect to the lower frame such that the seat assembly can optionally be used as a bed. The pivotal movement of the upper frame between or among such positions is preferably substantially independent of the movement or position of the lower frame, although in some applications, certain upper frame positions may be required when the lower frame is in the storage or stowage position in order to minimize the storage space occupied or to minimize interference with other items.

Also, in the preferred seating assembly according to the invention, the above-mentioned support mechanism includes front and rear support members or subassemblies that are both actuable by the above-mentioned single actuating lever or handle, and that are capable of moving or articulating in combination with each other in a manner such that when moved to the stowage position, the seat assembly does not project forwardly substantially beyond its forward projection when in its use position, thereby minimizing its stowage space requirements and its interference with other seating or other interior components when stowed, and thus enhancing rather than limiting the utility of the vehicle under a wide variety of situations encountered by the user.

Additional objects, advantages, and features of the present invention will become apparent from the following description and appended claims, taken in conjunction with the accompanying drawings.

DETAILED DESCRIPTION OF THE PREFERRED EMBODIMENTS

Figure 1:
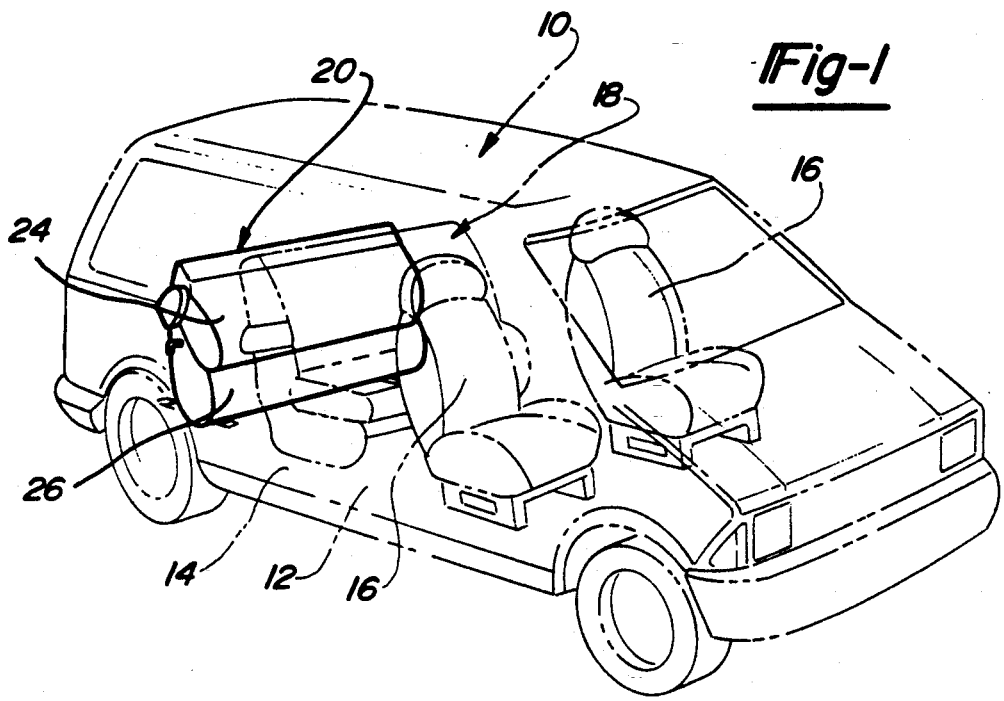
FIG. 1 is a perspective view of a vehicle, shown in phantom lines, having a folding bedseat according to the present invention in the stowage position.
Figure 2:
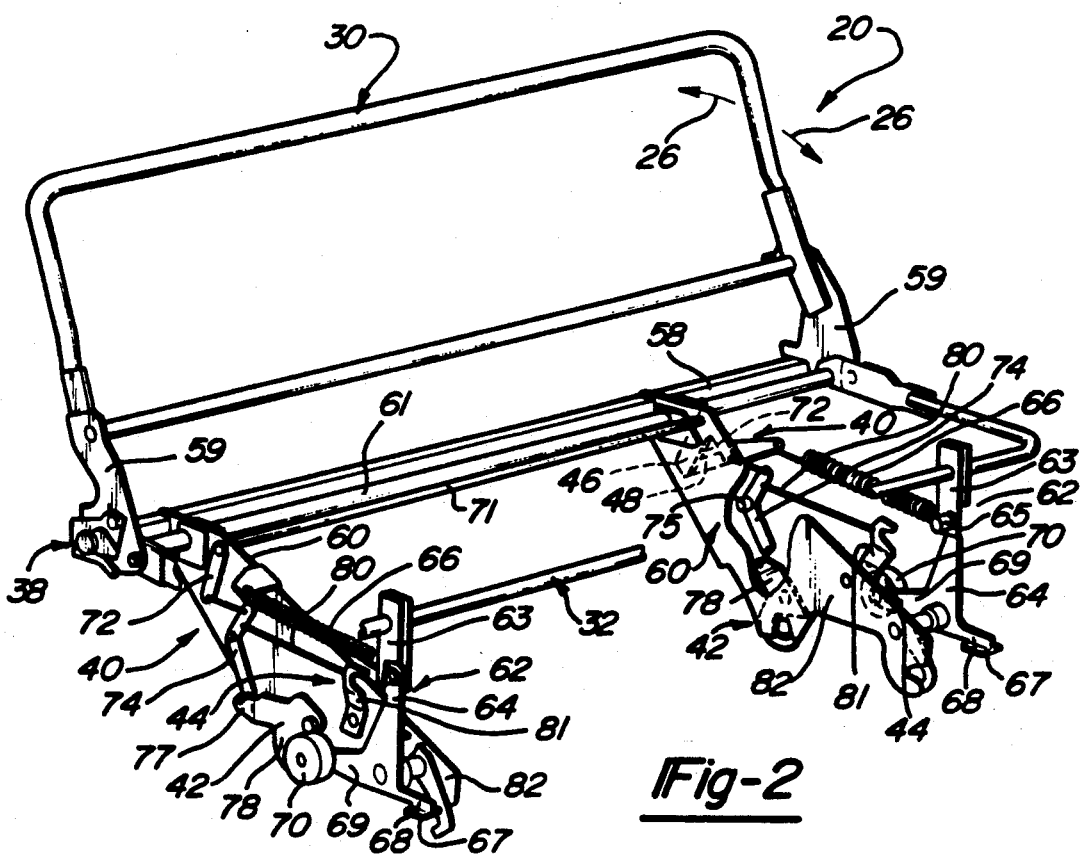
FIG. 2 is a perspective view of the structural frame and folding mechanisms of the folding bedseat of FIG. 1.

FIGS. 1 through 6 illustrate merely exemplary preferred embodiments of the present invention, as applied in a folding bedseat assembly for a vehicular installation. One skilled in the art will readily recognize from the following discussion that such illustrative embodiments are merely exemplary, and that the present invention is also applicable to folding seat or other folding accessory assemblies for installations other than the exemplary vehicular embodiments depicted merely for purposes of illustration in the drawings.

Referring first to FIG. 1, an exemplary vehicle 10 includes an interior 12 having an interior floor structure 14, upon which a pair of front seats 16, an intermediate seat 18, and an exemplary rear folding seat assembly 20, according to the invention, are supported. It should be emphasized that the bedseat arrangement depicted in connection with the vehicle 10 in FIG. 1 is capable of at least a stowage configuration, a use configuration with the upper cushion and frame in a generally vertical position for normal sitting and the like, and a bed configuration with the upper cushion and frame generally flat with respect to the lower cushion and frame. As mentioned above, this embodiment is shown for purposes of illustration only. One skilled in the art will readily recognize, from the discussion herein and from the drawing figures, that the invention is equally applicable in other seat assembly applications that include the capability for retaining the upper cushion and frame in only one of the above-mentioned use or bed configurations.

Referring now primarily to FIGS. 2 through 6, the folding seat assembly 20 is illustrated in more detail. The seat assembly 20 generally includes an upper frame 30, upon which an upper seat cushion assembly 24 is mounted or attached in a conventional manner, and a lower frame 32, upon which a lower seat cushion assembly 26 is similarly mounted or attached.

Figure 5:
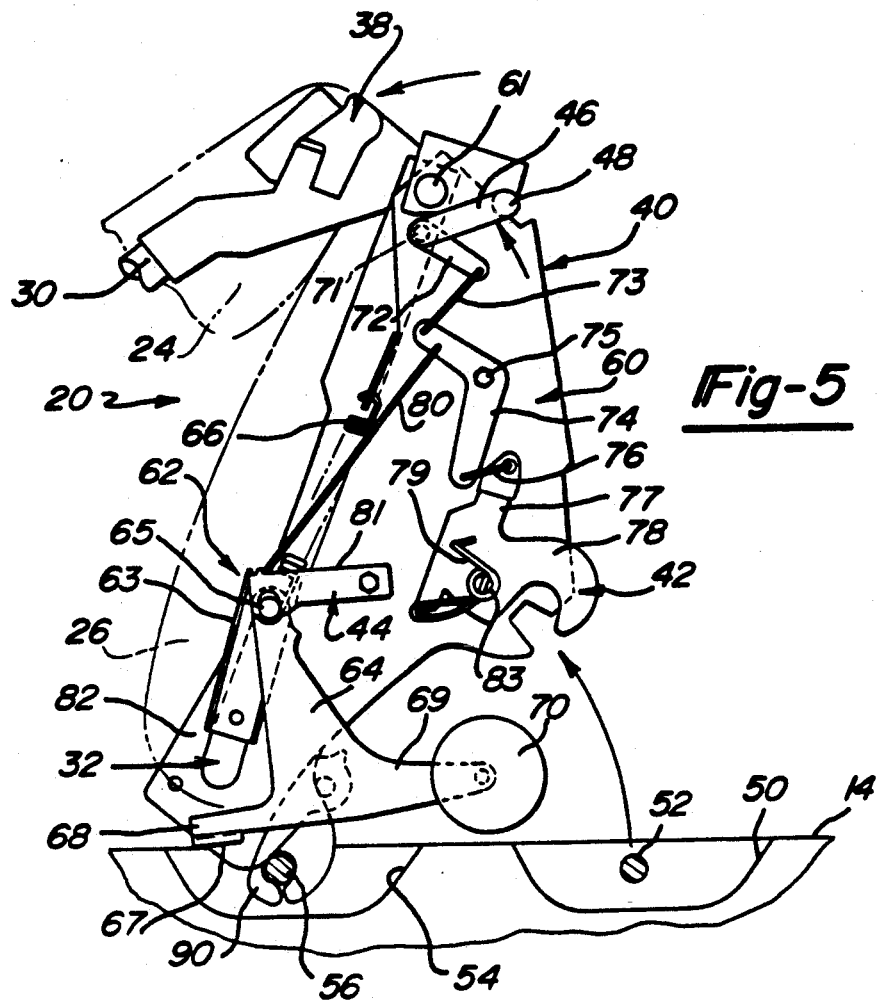
FIG. 5 is a partial side view, similar to that of FIGS. 3 and 4, but illustrating the folding mechanism when the movement of the seat assembly into its folded, stowage position has been completed.

An upper latch folding assembly, which can be any of a number of pivoting latch assemblies, is illustrated generally at reference numeral 38, and is adapted to be operable to allow the upper frame 30 to pivot either forwardly or rearwardly relative to the lower frame 32, as indicated by the pivot direction arrows, as well as to retain the upper frame 30 in its folded stowage and in its unfolded use and bed configurations, as described above. Although the pivoting motion of which the upper frame 30 is preferably accomplished independently of the folding movement of the lower frame 32, described below, it will be readily appreciated that in many applications, the upper frame 30 and the upper seat cushion 24 must be folded to their stowage position, as shown in FIG. 1 and 5, in order to minimize the space taken up by the seat assembly 20 when in its stowed configuration and to avoid interference with other components, such as the intermediate seat 18, for example.

The folding seat assembly 20, according to the invention, also includes a pair of support mechanisms 40, one on each lateral side, which provide for the pivoting, folding movement of the lower frame 32 in the manner described below. Each such support mechanism 40 includes first and second retention mechanisms 42 and 44 for releasably retaining the lower frame 32 in the use position shown in FIG. 3 and in the stowage position shown in FIG. 5, respectively. The first and second retention mechanisms 42 and 44 are actuated along with the remainder of the overall support mechanism 40 by user actuation of a single actuation lever 46, which can include an actuation handle 48, as illustrated in FIGS. 2 through 6.

Each of the support mechanisms 40 also includes a rear support member 60 pivotally interconnected with the lower frame by way of a pivot bar 61, which forms a part of the lower frame 32. The rear support members 60 are welded to opposite ends of a transverse box-section member 58 for lateral rigidity. Each support mechanism also includes a front support assembly 62, which in turn includes an upper front support member 63 pivotally interconnected to form a knee joint with a lower front support member 64, by way of a pivot pin 65. A high-spring-rate assist spring 66 interconnects the rear support member 60 with this knee joint, by way of one end being attached to the pivot pin 65, and is loaded in tension when the seat assembly 20 is in the use position shown in FIG. 3 in order to assist in the movement of the lower frame 32 from the use position to the stowage position shown in FIG. 5. By such an arrangement, the effort required by the user to fold and stow the seat assembly 20 is significantly minimized. Such assist is not needed to move the seat assembly 20 from its stowage position to its use position due to the weight of the seat assembly and the mechanical advantage provided by the support mechanism.

Figure 4:
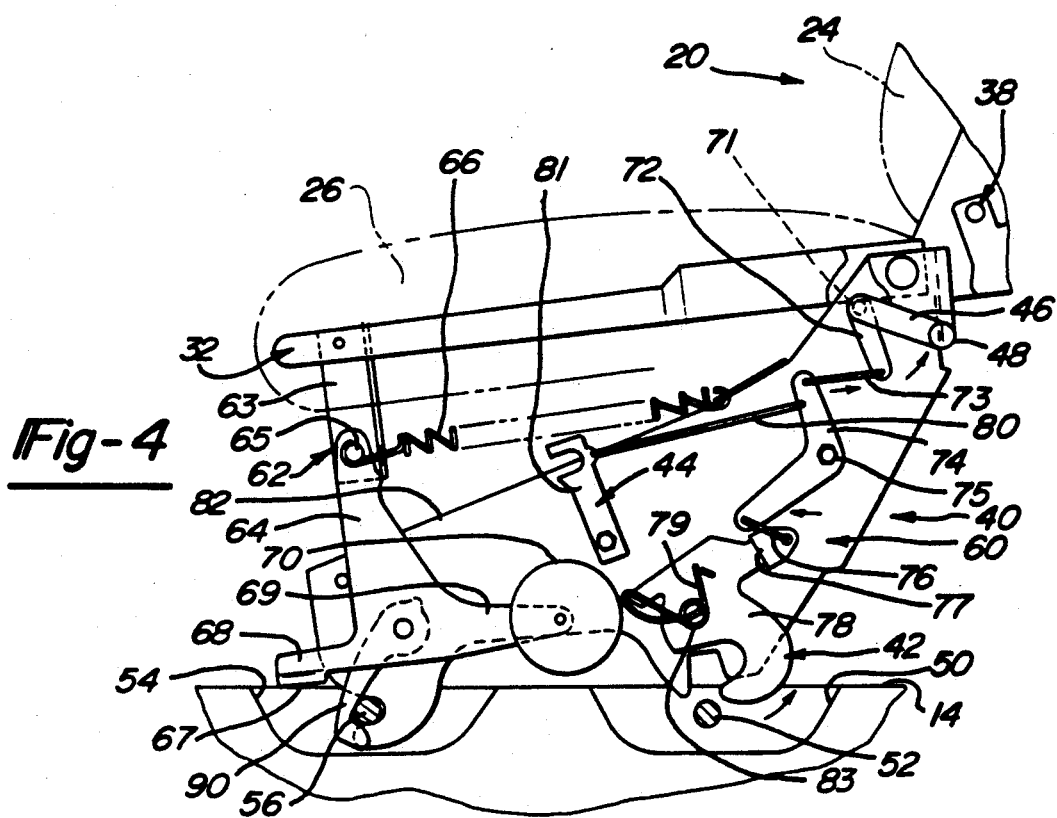
FIG. 4 is a partial side view, similar to that of FIG. 3, but illustrating the folding mechanism when the seat assembly is beginning to be moved into a folded, stowage position.
Figure 6:
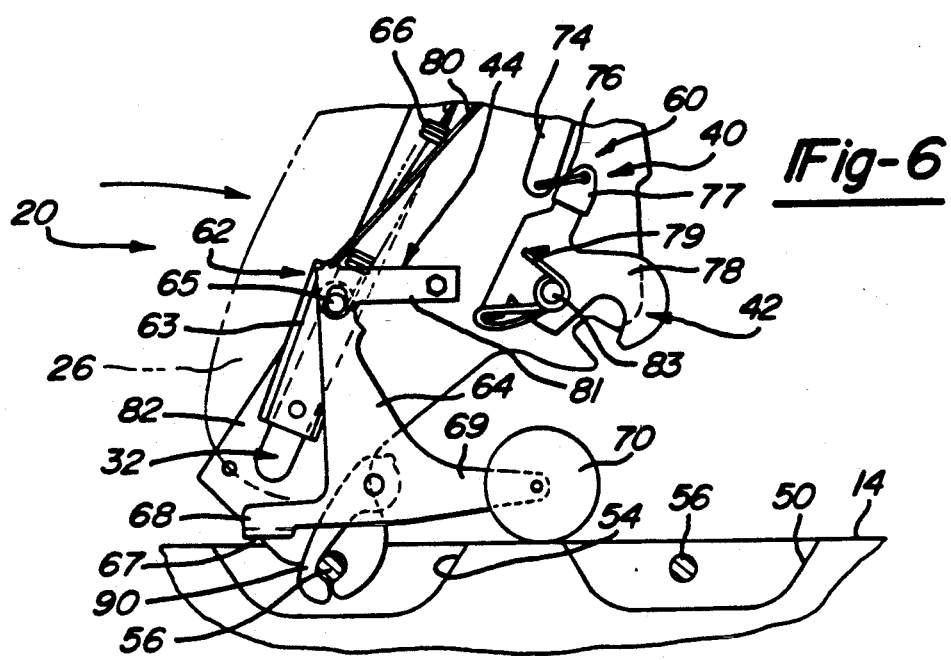
FIG. 6 is a partial side view, similar to that of FIGS. 3 through 5, but illustrating the folding mechanism when the seat assembly is beginning to be moved from its stowage position back into its use position.

The lower front support member 64 also preferably includes a first lever portion 68 protruding generally in a forward direction and a second lever portion 69 protruding generally in a rearward direction. The first lever portion 68 has a tab 67 formed at its forwardmost end for abuttingly engaging the interior floor 14 when the seat assembly 20 is being moved from its use position toward its stowage position, as is illustrated in FIG. 4, and the second lever portion 69 having an optional bearing roller 70 at its rearwardmost end for similarly engaging the interior floor 14 as the seat assembly 20 is being moved from its stowage position toward its use position, as is illustrated in FIG. 6. The purposes and functions of these lever portions are discussed below, along with those of the remainder of the components of the support mechanism 40, in conjunction with the following description of the support mechanism's function and operation.

Figure 3:
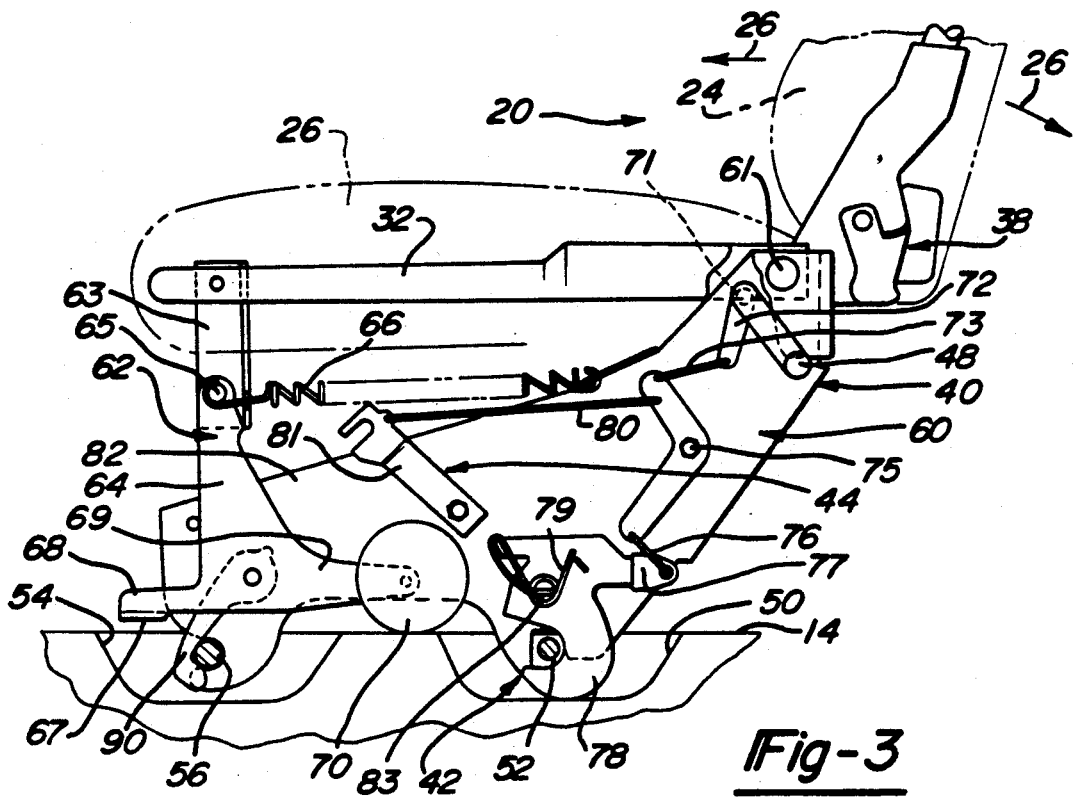
FIG. 3 is a partial side view of the folding bedseat of FIG. 1, with the upper and lower seat cushion portions shown in phantom lines, illustrating a preferred embodiment of the folding mechanism according to the present invention when the seat assembly is in an unfolded, use position.

When the seat assembly 20 is in its use position shown in FIG. 3, and the actuation handle 48 is urged upwardly by the operator, thereby pivoting the actuation lever counter-clockwise, a rod 71 fixedly attached to the actuation lever 46 and a pair of linkage members 72 are pivoted counter-clockwise (as viewed in FIG. 3). This counter-clockwise pivoting motion is translated to a clockwise pivoting motion of the linkage members 74 by way of the link pins 73, which pivotally interconnect the linkage members 72 and 74 on each respective side of the seat assembly 20.

The clockwise pivoting of the angle-shaped linkage members 74 about their respective pivot pins 75 in turn causes the link pins 76 to pivot the tabs 77 and pawl portions 78 of the first retention members 42 in a counter-clockwise direction about the pivot pins 83, against the resilient biasing force of their respective return springs 79. This motion releases the pawl portions 78 of the retention members 42 from their engagement with the respective rear retention pins 52 in the interior floor wells 50 on each lateral side of the seat assembly 20, thus freeing up the rear support members 60 for folding, pivoting movement of the seat assembly 20 in a direction toward its stowage position.

As shown in FIG. 4, continued spring-assisted upward and forward movement of the actuation handle 48 and the actuation lever 46 causes the rear support members 60 and the lower front support members 64 (and thus the lower frame 32) to pivot counter-clockwise about the front retention pins 56 in the interior floor wells 54 on each side of the seat assembly 20, due to the releasable engagement of leg portions 82 of the rear support members 60 with the front retention pins 56. This pivoting motion, upwardly and forwardly, continues until the tabs 67 on the first lever portions 68 abut with the interior floor 14. At this point in the operation, the assembly cannot continue to pivot about the front retention pins 56, so the lower frame 32 and the seat assembly 20 continues to pivot upwardly and forwardly about the knee joints formed by the pivot pins 65, which in turn causes the respective upper front support members 63 to also pivot about the pivot pins 65, until the lower frame 32, and thus the seat assembly 20 reaches its stowage position shown in FIG. 5.

At this point, the retention members 81 of the second retention mechanisms 44 have been pivoted counter-clockwise into a position at which they can be moved into retaining engagement with respective pins 65, as a result of the counter-clockwise pivoting of the linkage members 74, acting through the respective long pin links 80, when the actuating handle 48 is released by the operator and allowed to pivot in a clockwise direction. This engagement of the retention members 81 with the pins 65 serves to releasably retain the seat assembly 20 in its stowage position shown in FIG. 5.

The return of the seat assembly 20 to its use position is accomplished in essentially the same manner as that described above, but in reverse. Such reverse, or clockwise pivoting of the seat assembly 20 is initiated by the user first lifting the actuating handle 48 to release the retention members 81 from their engagement with the pivot pins 65. At this point, the user pulls the seat assembly 20 rearwardly, causing the lower frame 32 (and the entire seat assembly 20) to pivot in a clockwise direction about the front retention pins 56 until the bearing rollers 70 abut against the interior floor 14. This causes the upper front support members 63 to pivot clockwise, along with the lower frame 32, about the pivot pins 65 and the lower front support members 64, and causes the knee joints to correspondingly unfold and straighten out. The remainder of the return motion is merely clockwise pivoting motion (about the pivot pins 65) until the pawls 78 of the first retention mechanisms 42 again engage and lock onto the rear retention pins 52, thus returning the seat assembly 20 into the use position discussed above and shown in FIG. 3.

It should be emphasized that the knee joints between the support members 63 and 64, which are formed by the pivot pins 65, do not allow the upper front support member 63 to pivot in a clockwise direction from the position shown in FIG. 3. Also, such knee joints contribute to allow the seat assembly 20 to project substantially no further forward when in its stowage position than when in its use position, thus reducing the possibility of interference with the intermediate seat 18, or with other items in the interior. This feature also minimizes the amount of storage space taken up by the stowed seat assembly 20.

It should also be pointed out that the seat assembly can be completely removed from the vehicle interior by merely releasing the pawls 90 from the front retention pins 56, as is conventional in this type of seat arrangement, after the seat assembly 20 is folded into its stowage position, or at least after the rear pawls 78 have been released from the rear retention pins 52. In this regard there is an advantage to removing the seat assembly 20 while in its stowed configuration, since it may fit more easily through a vehicle side door opening when in this folded, compact configuration.

Also in this regard, it should be mentioned that the bearing rollers 70 can be used to assist the operator in removing the seat assembly 20 from the vehicle by allowing the assembly to be rolled out the rear door opening of a van-type vehicle, or other vehicle having a tailgate, once the assembly is locked and retained in the stowage position. Alternately, if more than one set of the wells 50 and 54, and their respective retention pins 52 and 56, are provided in order to allow the seat assembly 20 to be retained in alternate locations within the interior 12, the rollers 70 make relocating the assembly from one alternate location to another much easier than if the seat assembly had to be slid or dragged along the floor 14.

Finally, although only one actuation lever 46 and actuation handle 48 is provided to pivot the rod 71 and the linkage members 72 in the exemplary embodiment shown in the drawings, a similar lever-and-handle arrangement can also optionally be provided on the opposite side of the seat assembly 20 in order to allow the operator to fold and unfold the seat assembly from either side of the vehicle.

The foregoing discussion discloses and describes merely exemplary embodiments of the present invention for purposes of illustration only. One skilled in the art will readily recognize from such discussion, and from the accompanying drawings and claims, that various changes, modifications and variations can be made therein without departing from the spirit and scope of the invention as defined in the following claims.

What is claimed is:

1. A folding seat assembly for a vehicle having an interior, said folding seat assembly comprising:
    a lower frame;
    a support mechanism interconnected with said lower frame for supporting said seat assembly in the interior of the vehicle and for selectively moving said lower frame between a generally horizontal use position and a generally vertical stowage position;
    said support mechanism including a rear support member interconnected with a rearward portion of said lower frame, a front support assembly pivotally interconnected with a forward portion of said lower frame and pivotally interconnected with the interior of the vehicle, first retention means for releasably engaging said rear support member to retain said lower frame in said use position, and second retention means for releasably engaging said front support assembly to retain said lower frame in said stowage position; and
    said support mechanism further including a single actuation means for actuating both said first and second retention means to enable movement of said lower frame between said use position and said stowage position.

2. A folding seat assembly according to claim 1, further including an upper frame pivotally interconnected with said lower frame for moving said upper frame relative to said lower frame between at least an unfolded use position and a folded stowage position.

3. A folding seat assembly according to claim 1, wherein said rear support member is pivotally interconnected with said rearward portion of said lower frame.

4. A folding seat assembly according to claim 1, wherein said front support assembly includes an upper elongated front support member and a lower elongated front support member, said front support members being pivotally interconnected with one another for relative pivotal movement between an extended orientation generally longitudinally and colinearly aligned with each other when said lower frame is in said use position and a retracted orientation generally transverse to each other when said lower frame is in said stowage position.

5. A folding seat assembly according to claim 4, further including third retention means for releasably interconnecting said front support assembly with the interior of the vehicle.

6. A folding seat assembly according to claim 4, wherein said rear support member is pivotally interconnected with said rearward portion of said lower frame.

7. A folding seat assembly according to claim 6, further including third retention means for releasably interconnecting said front support assembly with the interior of the vehicle.

8. A folding seat assembly according to claim 4, wherein said lower front support member includes a first lever member protruding generally forwardly therefrom for contacting the interior of the vehicle when said lower frame is moved to said stowage position in order to cause said front support members to pivot relative to each other into said retracted orientation.

9. A folding seat assembly according to claim 8, wherein said lower front support member includes a second lever member protruding generally rearwardly therefrom for contacting the interior of the vehicle when said lower frame is moved to said use position in order to cause said front support members to pivot relative to each other into said extended position.

10. A folding seat assembly according to claim 9, further including linkage means interconnecting said first and second retention means with said actuation handle means, actuation of said actuation handle means causing actuation of said first and second retention means during said movement of said lower frame.

11. A folding seat assembly for a vehicle having an interior, said folding seat assembly comprising:
a lower frame;
a support mechanism interconnected with said lower frame for supporting said seat assembly in the interior of the vehicle and for selectively moving said lower frame between a generally horizontal use position and a generally vertical stowage position;
said support mechanism including first retention means for releasably retaining said lower frame in said use position, and second retention means for releasably retaining said lower frame in said stowage position, said support mechanism further including a front support assembly pivotally interconnected with a forward portion of said lower frame and pivotally interconnected with the interior of the vehicle for supporting said front portion in both said use position and said stowage position, said front support assembly including an upper elongated front support member and a lower elongated front support member, said front support members being pivotally interconnected with one another for relative pivotal movement between an extended orientation generally longitudinally and colinearly aligned with each other when said lower frame is in said use position and a retracted orientation generally transverse to each other when said lower frame is in said stowage position, said lower front support member including a first lever member protruding generally forwardly therefrom for contacting the interior of the vehicle when said lower frame is moved to said stowage position in order to cause said front support members to pivot relative to each other into said retracted orientation, and said lower front support member also including a second lever member protruding generally rearwardly therefrom for contacting the interior of the vehicle when said lower frame is moved to said use position in order to cause said front support members to pivot relative to each other into said extended position;
said support mechanism also including a rear support member pivotally interconnected with a rearward portion of said lower frame and releasably interconnected with the interior of the vehicle for supporting said rearward portion in both said use position and said stowage position; and
said support mechanism further including a single actuation means for actuating both said first and second retention means and for moving said lower frame between said use position and said stowage position.

12. A folding seat assembly according to claim 11, further including an upper frame pivotally interconnected with said lower frame, for moving said upper frame relative to said lower frame between at least an unfolded use position and a folded stowage position.

13. A folding seat assembly according to claim 11, further including linkage means interconnecting said first and second retention means with said actuation handle means, actuation of said actuation handle means causing actuation of said first and second retention means during said movement of said lower frame.

14. A folding seat assembly for a vehicle having an interior, said folding seat assembly comprising a lower frame, a support mechanism interconnected with said lower frame for supporting said seat assembly in the interior of the vehicle and for selectively pivoting said lower frame between a generally horizontal use position and a generally vertical stowage position, and retention means for releasably retaining said lower frame in said use position and said stowage position; the improvement wherein said support mechanism includes a rear support member interconnected with the rearward portion of said lower frame and releasably interconnected to the interior of the vehicle by said retention means when said lower frame is in said use position and a front support assembly pivotally interconnected with a forward portion of said lower frame and pivotally interconnected with the interior of the vehicle, said front support assembly comprising an upper front support member and a lower front support member pivotally interconnected with one another for relative pivotal movement between an extended generally aligned orientation when said lower frame is in said use position and a folded generally transverse orientation when said lower frame is in said stowage position, and operative means responsive to the pivotal movement of said lower frame from said use position to said stowage position for limiting pivotal movement of the front support assembly relative to the vehicle interior to a predetermined angle and causing said upper and lower front support members to pivot relative to each other into said folded orientation.

15. A folding seat assembly of claim 14 wherein said operative means contacts the interior of the vehicle in response to the pivoting of said lower frame from said stowage position back to said use position for causing said upper and lower front support members to pivot relative to one another from said folded orientation back to said extended orientation.

16. A folding seat assembly of claim 15 wherein said operative means comprises a first lever member protruding generally forwardly from said lower front support member for contacting the interior of the vehicle when said lower frame is initially pivoted from said use position toward said stowage position and a second lever member protruding generally rearwardly from said lower front support member for contacting the interior of the vehicle when said lower frame is pivoted back to said use position.

17. A folding seat assembly of claim 14 further including bias means for assisting in pivoting said lower frame from said use position to said stowage position.

18. A folding seat assembly of claim 1 further including bias means for assisting in pivoting said lower frame from said use position to said stowage position.

* * * * *